United States Patent
Schoenauer

(10) Patent No.: US 9,476,468 B2
(45) Date of Patent: Oct. 25, 2016

(54) DISC BRAKE AND BRAKE PAD FOR A DISC BRAKE

(71) Applicant: KNORR-BREMSE Systeme fuer Nutzfahrzeuge GmbH, Munich (DE)

(72) Inventor: Manfred Schoenauer, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 57 days.

(21) Appl. No.: 14/227,627

(22) Filed: Mar. 27, 2014

(65) Prior Publication Data
US 2014/0209419 A1     Jul. 31, 2014

Related U.S. Application Data

(63) Continuation of application No. PCT/EP2012/067888, filed on Sep. 13, 2012.

(30) Foreign Application Priority Data

Sep. 28, 2011 (DE) ........................ 10 2011 115 213

(51) Int. Cl.
*F16D 65/092* (2006.01)
*F16D 55/226* (2006.01)
(Continued)

(52) U.S. Cl.
CPC ............ *F16D 65/092* (2013.01); *B60T 1/065* (2013.01); *F16D 55/226* (2013.01); *F16D 65/095* (2013.01); *F16D 2055/0016* (2013.01)

(58) Field of Classification Search
CPC ............... F16D 2127/10; F16D 65/18; F16D 2127/08; F16D 55/46; F16D 2121/02
USPC .................... 188/72.2, 72.1, 71.8, 71.1, 72.7
See application file for complete search history.

(56) References Cited

U.S. PATENT DOCUMENTS 3,638,764 A * 2/1972 Anders ................... F16D 66/02
                                                    188/1.11 R
3,860,094 A * 1/1975 Breton .......................... 188/72.2
(Continued)

FOREIGN PATENT DOCUMENTS

CN          101631966 A      1/2010
DE          11 53 949 B      9/1963
(Continued)

OTHER PUBLICATIONS

DE102007057992 English Machine Translation.*
(Continued)

*Primary Examiner* — Melanie Torres Williams
(74) *Attorney, Agent, or Firm* — Crowell & Moring LLP

(57) ABSTRACT

A disc brake for a commercial vehicle includes a brake caliper which takes the form of a sliding caliper and straddles a brake disc. In the caliper, brake pads are arranged on an actuation side and a reaction side, which pads can be pressed against both sides of the brake disc by an actuation device during braking. The reaction-side brake pad is supported on a rear-side wall of the brake caliper by a pad carrier plate carrying a friction pad, and a gap is formed in a non-operational position in a region facing an assembly opening of the brake caliper between the rear-side wall of the brake caliper and the reaction-side brake pad. The gap is wider than the adjacent region and the length of the gap corresponds at least to the length of the contact surface of the reaction-side wall on the pad carrier plate when braking is applied. The disc brake is disposed such that the gap is formed by at least one recess in the pad carrier plate. The recess is integrated into the planar rear side running parallel to the side carrying the friction pad. The recess runs at a distance from the edges of the pad carrier plate that delimit the longitudinal sides of the brake pad.

12 Claims, 5 Drawing Sheets

(51) Int. Cl.
  *F16D 65/095* (2006.01)
  *B60T 1/06* (2006.01)
  *F16D 55/00* (2006.01)

(56) References Cited

U.S. PATENT DOCUMENTS

| | | | |
|---|---|---|---|
| 4,289,216 A | 9/1981 | Shirai et al. | |
| 4,333,550 A * | 6/1982 | Shirai | 188/72.2 |
| 6,305,506 B1 * | 10/2001 | Shirai et al. | 188/72.2 |
| 2008/0271963 A1 | 11/2008 | Macke et al. | |
| 2008/0314697 A1 | 12/2008 | Kloos | |
| 2010/0038194 A1 | 2/2010 | Emmett et al. | |

FOREIGN PATENT DOCUMENTS

| | | |
|---|---|---|
| DE | 29 25 785 A1 | 1/1980 |
| DE | 94 14 032 U1 | 10/1994 |
| DE | 10 2005 023 116 A1 | 11/2006 |
| DE | 10 2007 057 992 A1 | 6/2009 |
| GB | 2 024 348 A | 1/1980 |
| JP | 5-126177 A | 5/1993 |
| JP | 2006-250188 A | 9/2006 |

OTHER PUBLICATIONS

International Preliminary Report on Patentability (PCT/IB/326) and (PCT/IB/373) dated Apr. 10, 2014, including Written Opinion (PCT/ISA/237) (six (6) pages).
International Search Report with English translation dated Nov. 23, 2012 (5 pages).
German-language Office Action dated Jun. 21, 2012 (6 pages).
Chinese Office Action issued in counterpart Chinese Application No. 2012800479763 dated Aug. 5, 2015, with English translation (seventeen (17) pages).
Taiwanese Office Action issued in counterpart Taiwanese Application No. 101132988 dated Jul. 26, 2016, with partial English translation (six (6) pages).

* cited by examiner

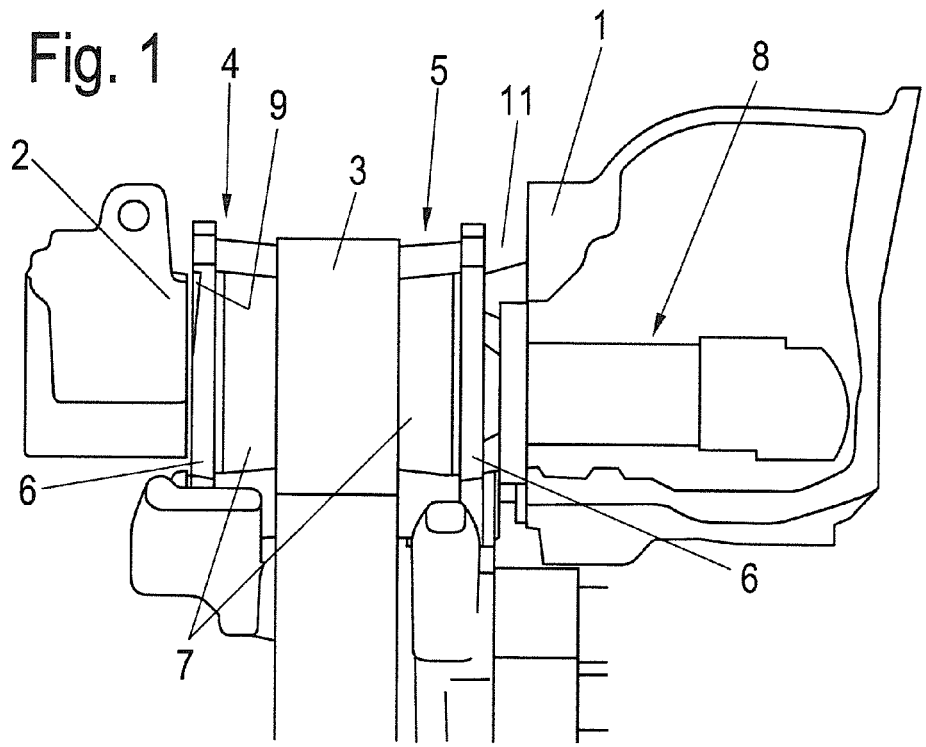
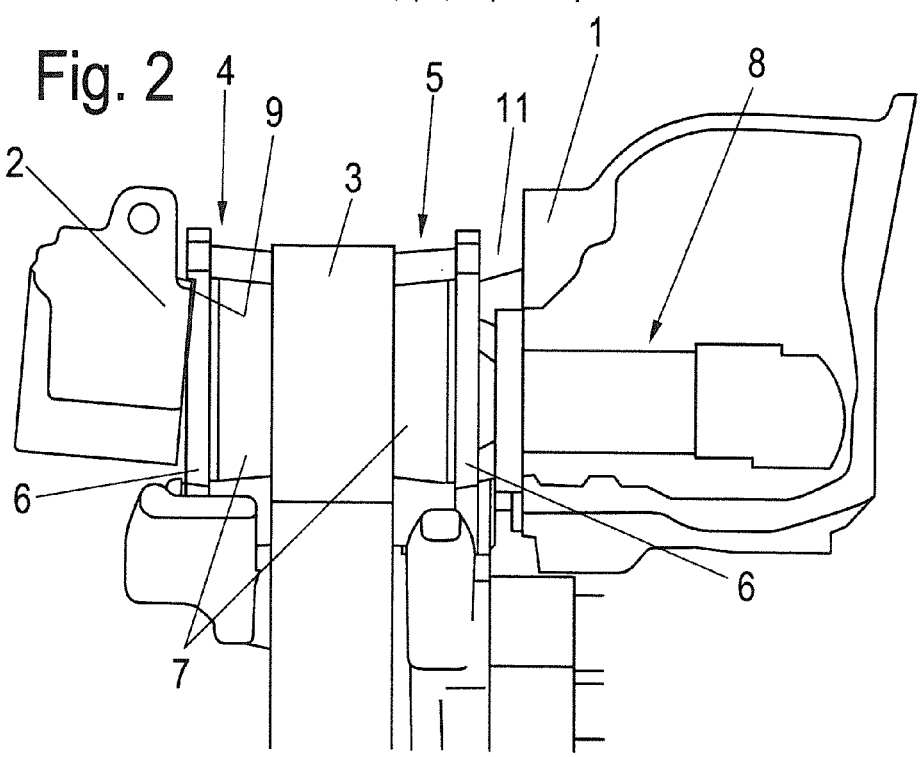

DISC BRAKE AND BRAKE PAD FOR A DISC BRAKE

CROSS REFERENCE TO RELATED APPLICATIONS

This application is a continuation of PCT International Application No. PCT/EP2012/067888, filed Sep. 13, 2012, which claims priority under 35 U.S.C. §119 from German Patent Application No. 10 2011 115 213.3, filed Sep. 28, 2011, the entire disclosures of which are herein expressly incorporated by reference.

BACKGROUND AND SUMMARY OF THE INVENTION

The invention relates to a disc brake for a commercial vehicle having a brake caliper designed as a sliding caliper and a brake disc, in which caliper a brake pad is arranged on a clamping side and on a reaction side, which upon a brake application by a brake application device can be pressed against the brake disc on both sides. The brake pad on the reaction side supports itself with a pad backing plate carrying a friction pad on a rear-end wall of the caliper. The invention also relates to a corresponding brake pad for a disc brake.

Such disc brakes are primarily employed with commercial vehicles. On actuating a brake application device, a brake pad on the clamping side and subsequently a brake pad on the reaction side are pressed against the brake disc for braking. The brake pads are usually positioned in pad shafts of a fixed-location caliper mount, wherein during a brake application their backing plates bear against horns of the caliper mount in the circumferential direction of the brake disc, through which the forces that occur during braking or the braking moment acting on the brake pads are absorbed.

Clamping of the brake, i.e. the bearing of the brake pads against the brake disc on both sides, during which the clamping force is active in the axial direction of the brake disc, leads to a loading of the brake caliper and, in the case of a suitably high braking force, to its deformation such that the brake caliper expands in the axial direction on its side facing the brake disc axis. Because of this, the region of the rear-end wall of the brake caliper located opposite and forming a bearing surface against the pad backing plate facing an assembly opening for inserting the brake pads is more strongly pressed against the pad backing plate. This means that the pressure distribution of the pad backing plate on the reaction side is variable.

Over the lifespan of the brake pad on the reaction side, the uneven bearing pressure leads to a high wear, the so-called radial tilted wear of the friction pad in the region facing the assembly opening.

Thus, a certain wear limit is already reached in this region while the friction pad material in the remaining regions is still adequate in its thickness. The brake pad therefore has to be replaced at an early stage, which obviously does not allow for a service life as long as possible.

To rectify this, it is proposed in DE 29 25 785 A1, to form a gap, in a non-functioning position, that is wider relative to the adjoining region between the rear-end wall of the brake caliper and the reaction-end brake pad in a region facing an assembly opening of the brake caliper. This is created in that the pad backing plate on its back facing the rear-end wall of the brake caliper is bevelled towards the assembly opening.

However, this results in substantial production engineering problems during the manufacture of the brake pad. Here, the friction pad material is usually applied onto the pad backing plate by pressing with high pressures and increased temperatures. In the process, the pad backing plate is supported with its back on a plane-flat thrust bearing of a press tool. A necessary support for absorbing the pressing pressure in the plumb direction is not ensured through the incline of the back, with the consequence that the friction pad is not applied sufficiently homogeneously. This leads to a reduction of the service life of the friction pad and, under certain conditions, to a restriction of the operational safety of the brake pad as a whole.

In addition to this, a high wear of the expensive press tool through lateral forces that occur through the reduced support of the pad backing plate has to be additionally complained about.

On the whole, this brake pad thus does not satisfy the demands made for an optimized service life and a maximum cost-effective production.

The invention is based on the object of further developing a disc brake of the generic type and a brake pad for a disc brake so that their service life is optimized and the operational safety improved.

This and other objects are achieved by providing a disc brake, and corresponding brake pad, having a brake caliper designed as a sliding caliper and a brake disc, in which caliper a brake pad is arranged on a clamping side and on a reaction side, which upon a brake application by a brake application device can be pressed against the brake disc on both sides. The brake pad on the reaction side supports itself with a pad backing plate, which carries a friction pad, on a rear-end wall of the caliper. Between the rear-end wall of the caliper and the reaction-side brake pad a gap is formed in a region facing an assembly opening of the caliper in a non-operational position. The gap is wider in the region facing the assembly opening relative to the adjoining region. A length of the gap corresponds at least to the length of the bearing of the wall on the pad backing plate in an operational or contact pressure position. The gap is formed by providing at least one recess in the back of the pad backing plate. The back of the pad backing plate is parallel and otherwise planar relative to the side carrying the friction pad. The recess runs spaced from the edges of the pad backing plate delimiting the longitudinal sides.

Through the invention it is achieved that the brake-induced wear of the brake pad on the reaction side takes place evenly, as a result of which a longer service life is obtained.

Here, the deformation of the brake caliper in the sense described can be accepted. In fact, an even lighter embodiment of the brake caliper is possible, since for this purpose merely the larger gap that is provided in the unbraked position of the disc brake, according to the invention between the rear-end wall of the brake caliper and the brake pad on the reaction side, has to be suitably adjusted, i.e. widened in a region facing the assembly opening of the brake caliper relative to the adjoining region.

The lighter design of the brake caliper that is possible through the invention fits in well with an always demanded weight optimization of the disc brake. In particular, this results in that the fuel consumption is reduced and thus the operating costs are lowered without influencing the functional safety. In addition, the production costs are also favorably influenced through the material reduction in the design of the new brake caliper.

In addition to this, the invention offers the advantage that a deformation of the brake disc in the axial direction created through braking heat known as "coning" is not critical insofar as the brake pad can now evade the largest expansion of the brake disc during "coning" in the region of the assembly opening. Thus, the pressure distribution between the friction pad and the brake disc is improved and the crack sensitivity of the brake disc that has been complained about up to now, reduced.

Depending on the clamping force and thus deformation degree of the brake caliper, the rear-end wall of the brake caliper increasingly comes to bear against the pad backing plate of the brake pad, wherein the surface pressure, which results from the exerted force and the bearing area between the rear-end wall of the brake caliper and of the pad backing plate, substantially remains the same throughout the entire clamping.

The wider gap according to the invention is achieved through a recess, the dimensioning of which is determined by the deformation behaviour of the brake caliper and which runs spaced from the edges of the pad backing plate delimiting the long sides.

Since the back with the recess located opposite the friction pad as a whole runs parallel to the side carrying the friction pad, a full-surface support of the pad backing plate in the press tool is obtained during the manufacture of the brake pad, which is positioned exactly transversely to the pressing direction.

At least the two edge regions of the back of the pad backing plate assigned to the long sides of the pad backing plate are plane-flat and thus form a full support.

The recess can be designed so that the adjoining plane-flat regions are large in area, which guarantees a good heat transfer and an even force introduction.

This, in turn, is prerequisite in order to achieve a homogeneous strength of the friction pad, as is required on the one hand for a service life optimization and on the other hand for a high operational safety.

In addition to this, the wear of the press tool is reduced through the even force distribution during pressing, with the result that the invention to a quite remarkable extent leads to a reduction of the production and operating costs.

Usually, the brake pads in their contour correspond to the brake disc, i.e. they are formed in the sense of a circular ring segment. The contour of the recess corresponds to that of the bearing surface of the wall and extends almost over the entire length of the pad backing plate or is segmented corresponding to the design and the deformation behavior of the brake caliper. Here, the recess can run symmetrically or asymmetrically to the radial axis.

Depending on requirement, the recess in the pad backing plate can be designed in a sharp-edged manner or with flat transitions to the adjoining regions that are raised relative to the recess, wherein the angles of the transitions are adapted to the deformations that are expected during the operation. The depth of the recess is dependent on the production possibility, however in particular on the strength of the pad backing plate and is preferably between 0.5 and 2 mm.

In addition to a production of the recess through a cutting process, the recess can also be produced through a shaping method, for example through stamping or the like. It is also contemplated to produce the recess through eroding or to introduce it during the forming of the pad backing plate as casting during the casting operation.

Contrary to this unitary formation of the pad backing plate, the recess can also be provided by way of an insert that can be joined into the pad backing plate.

In any case there is a possibility of subsequently inserting the new brake pad into an existing brake caliper, for example as part of a replacement, so that the advantages of the invention materialize also with existing brake systems.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows an exemplary disc brake according to the invention in a sectioned, schematic, lateral view in a non-operational position;

FIG. 2 shows the disc brake according to FIG. 1 in an operational or functioning position;

DETAILED DESCRIPTION OF THE DRAWINGS

Figure 3:
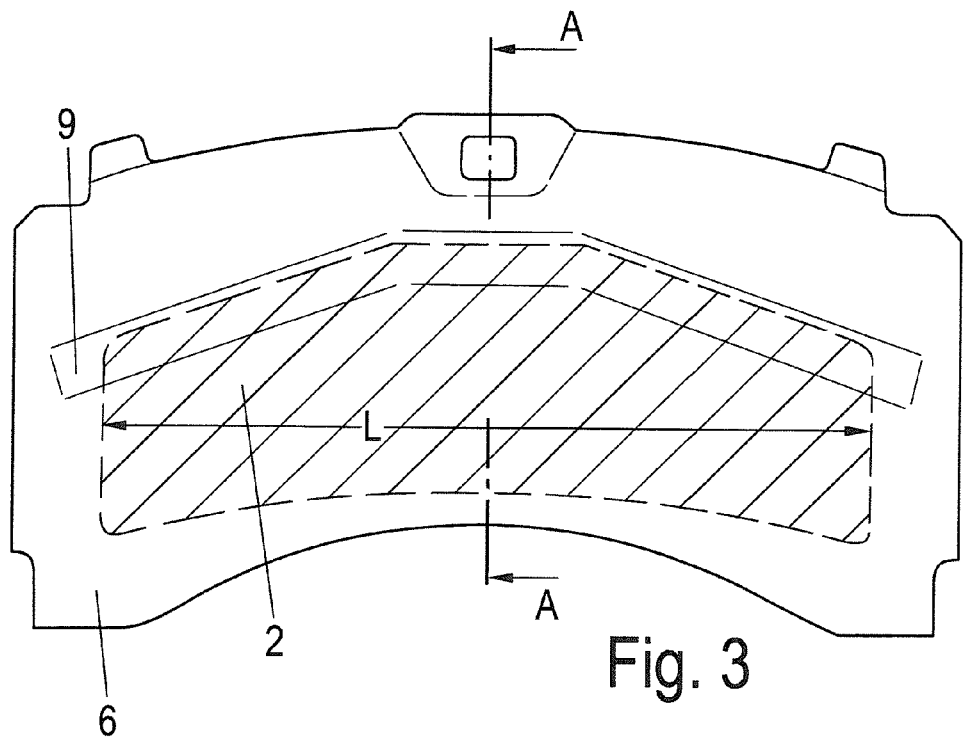
FIGS. 3-5 show exemplary embodiments of a brake pad according to the invention in a rear view.

FIGS. 1 and 2 schematically show a portion of a disc brake, wherein FIG. 1 reflects a position in which the disc brake is not yet fully clamped, while FIG. 2 reflects the position in a full brake application.

The disc brake comprises a brake caliper 1 designed as a sliding caliper, which straddles a brake disc 3 and in which a brake pad 5 is arranged on a clamping side and a brake pad 4 is arranged on a reaction side. Upon a brake application, the brake pads 4, 5 press against both sides of the brake disc 3 by way of a brake application (clamping) device 8.

Figure 4:
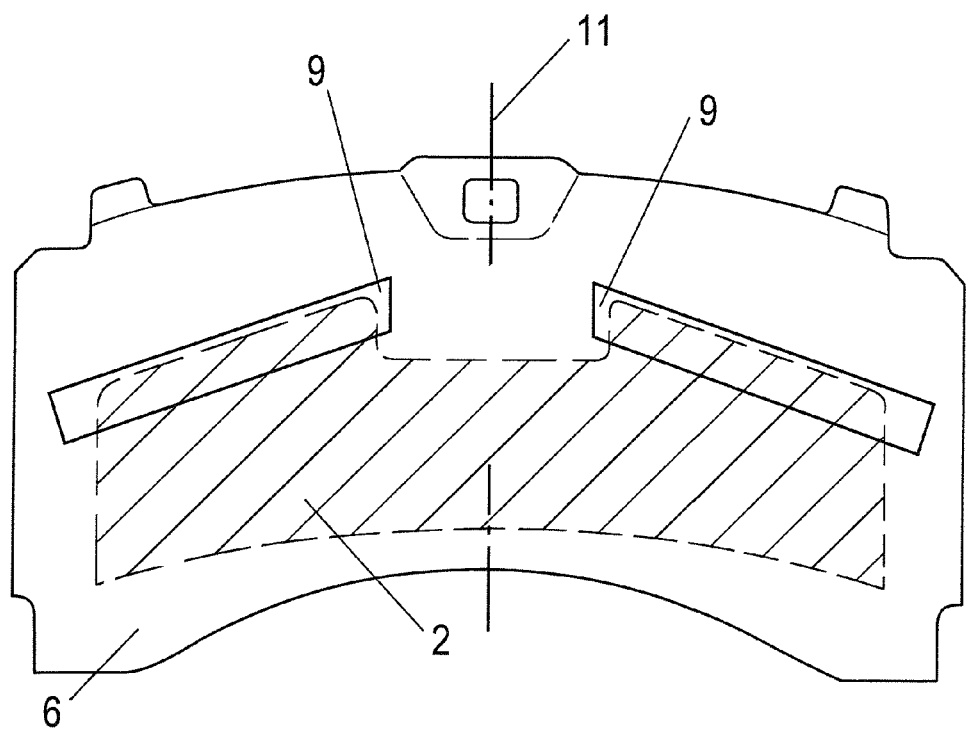
Figure 5:
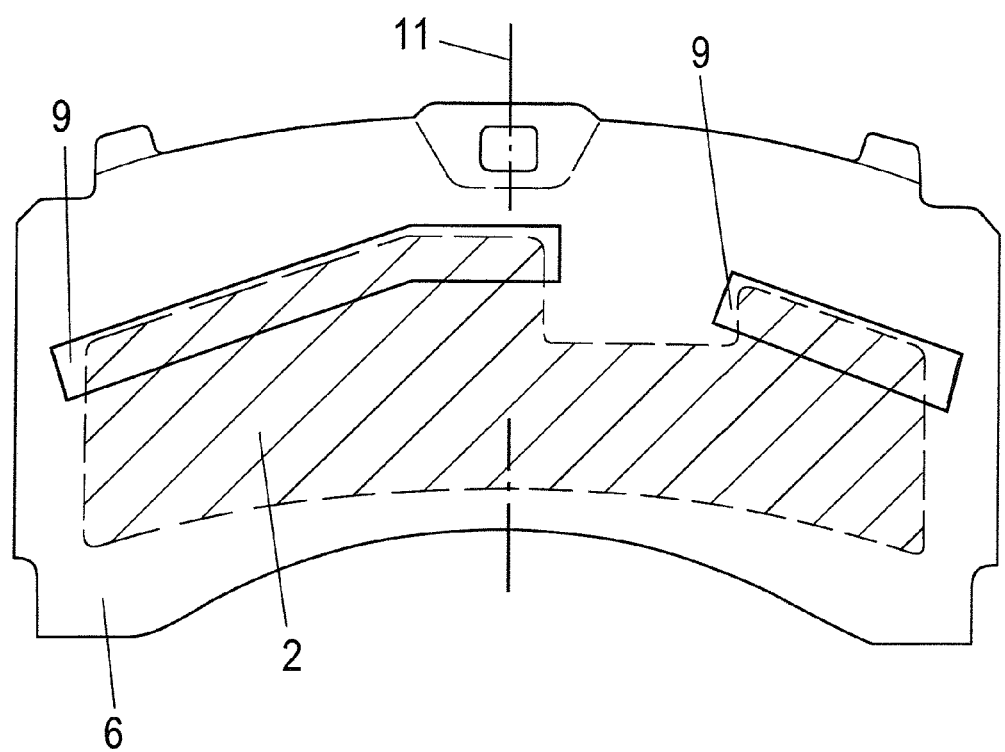

Here, the brake pad 4 on the reaction side supports itself with a pad backing plate 6, which carries a friction pad 7, on a rear-end wall 2 of the brake caliper 1, the bearing surface of which is shown hatched in FIGS. 3-5.

Between the rear-end wall 2 of the brake caliper 1 and the reaction-side brake pad 4, a gap is formed in a region facing an assembly opening 11. Via the assembly opening 11, the brake pads 4, 5 can be inserted in the non-operational position of the brake corresponding to FIG. 1. The gap formed in the region that faces the assembly opening is wider than in adjoining regions. The length of the gap, shown with the example of FIGS. 3 and 8, corresponds at least to the length L of the bearing of the wall 2 on the pad backing plate 6 in the contact pressure position.

The gap is formed by providing a recess 9 in the pad backing plate 6 on its back-side 12 that faces the wall 2. The profile of the recess 9 in cross section can be variable according to the exemplary embodiments according to FIGS. 6 and 7. Here, the back-side 12 runs parallel to a side 13 of the brake pad backing plate carrying the friction pad material 7.

While FIG. 1, as mentioned, reflects the disc brake in a non-operational position, in which the brake caliper 1 assumes its starting form, FIG. 2 shows a deformation of the brake caliper 1 as is obtained during a full brake application (operational or functioning position).

It is clearly evident that the brake caliper has "spread open" on the side facing away from the assembly opening 11, such that the wall 2 located adjacently opposite the recess 9, which in its contour is adapted to the wall profile 2, engages.

In FIGS. 3 to 7, a pad backing plate 6 of the brake pad 4 on the reaction side is shown, wherein in FIGS. 3 to 5 the profile of the recess 9 is evident, which runs adapted to the individual contour of the bearing surface in the brake caliper.

In FIG. 4, the pad backing plate 6 is provided with two recesses arranged on both sides of a radial axis 11, into which the wall 2 matched thereto with its contact surface regions dips. Here, the two recesses 9 are arranged mirror-symmetrically with respect to the radial axis 11.

In FIG. 5, two recesses 9 are likewise evident in the pad backing plate 6, however these recesses 9 run asymmetrically to the radial axis 11, the arrangement of which is likewise dependent on the deformation behavior of the wall 2.

Figure 6:
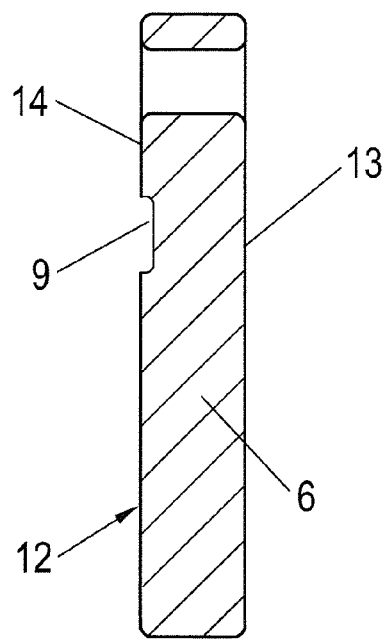
FIGS. 6 and 7(a) and 7(b) each show an exemplary embodiment of the brake pad according to the invention in a cross-sectional view, according to the line A-A in FIG. 3.
Figure 7A:
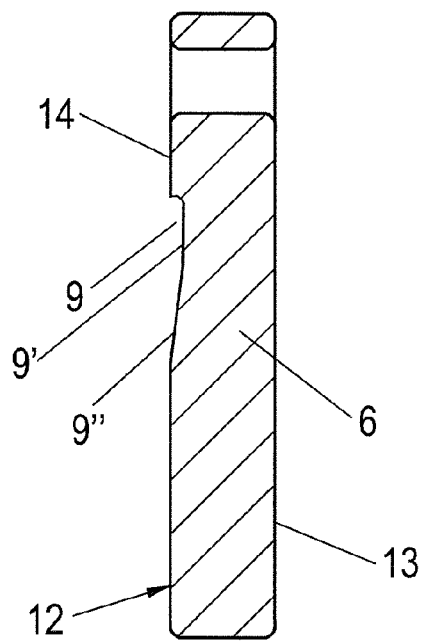

In FIG. 6, the recess 9 is evident in cross section. In this embodiment, the recess 9 has a sharp-edged design. In the example in FIG. 7, the recess 9 has a lower region that, from the upper region 14 convexly curved on the edge side, is flattened towards the lower region, The recess 9 in FIG. 7(a) starting from the upper edge region 14, initially has a flat surface 9' that is parallel to the back-side 12, and then merges into an incline 9".

Figure 7B:
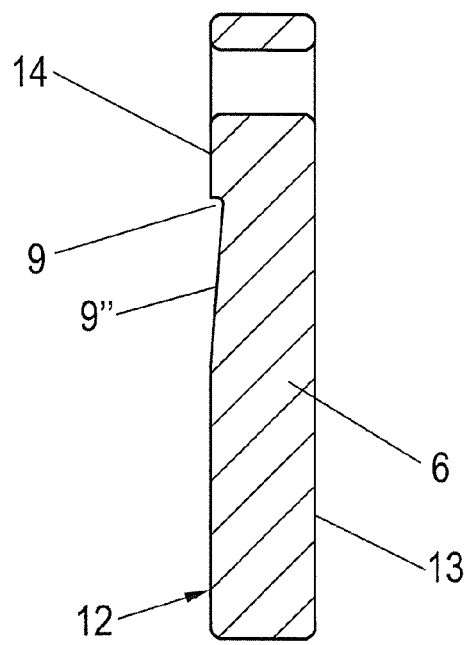

In FIG. 7(b) by contrast, the recess 9 is exclusively designed as an incline 9" running in the direction of the upper edge region 14. Otherwise, the upper edge region 14 and the region of the back 12 located opposite are arranged aligned or flush with each other, i.e. in a common plane running parallel to the side 13. The thickness of the pad backing plate 6 in this region is therefore the same.

Figure 8:
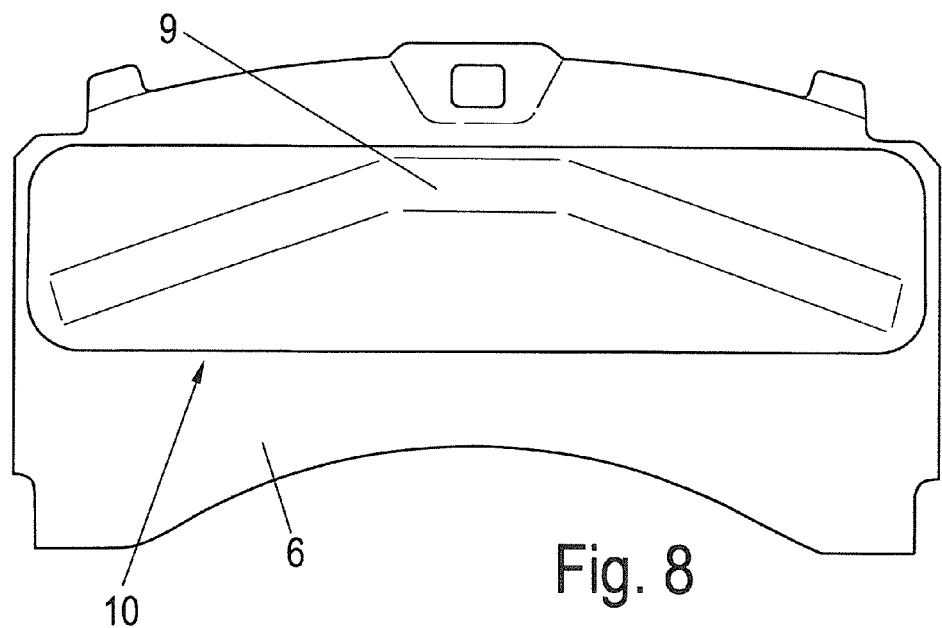
FIG. 8 shows a further exemplary embodiment of a brake pad in a rear view.
Figure 9:
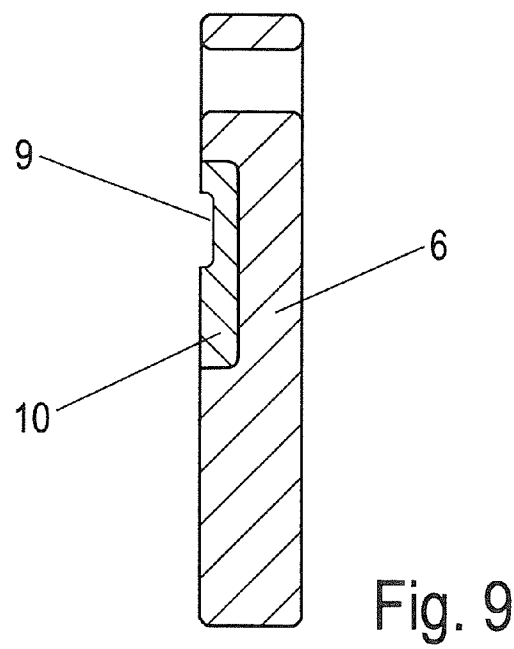
FIG. 9 shows the brake pad according to FIG. 8 in a cross sectional view.

As with the examples shown in FIGS. 3 to 5, the recess 9 with the version shown in FIGS. 8 and 9, is also arranged in the upper half of the pad backing plate 6 assigned to the convex outer edge.

In this example, the recess 9 is introduced as an insert 10, which is inserted in the pad backing plate 6. Obviously, the recess 9 in the insert 10 can also be provided in the form proposed in FIGS. 7(a) and 7(b).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, the disc brake comprising:
    a sliding caliper configured to straddle the brake disc when in use; and
    first and second brake pads, one of which is arranged in the caliper on a clamping side and another of which is arranged on a reaction side, the brake pads being pressable against the brake disc via a brake application device, wherein
        the brake pad on the reaction side comprises a pad backing plate on one side of which is carried a friction pad material, the reaction-side brake pad being supported with the pad backing plate on a rear wall of the caliper,
        between the rear-end wall of the caliper and the pad backing plate of the reaction-side brake pad, a gap is formed which, in a non-operational position of the disc brake, is wider in a region facing an assembly opening of the caliper through which the brake pad is inserted than in an adjoining region,
        a length of the gap corresponds at least to a length of a portion of the rear-end wall that bears against the pad backing plate in a contact pressure position,
        the wider portion of the gap is formed by a recess provided in a back side of the pad backing plate, which back side is otherwise arranged parallel to the side of the pad backing plate carrying the friction pad material,
        the recess provided in the back side extends at a distance from edges of the pad backing plate that delimit longitudinal sides of the pad backing plate, and
        a cross-sectional profile of the recess is adapted to a contact angle of the rear-end wall that changes via deformation of the caliper during application of the disc brake.

2. The disc brake according to claim 1, wherein the gap is configured to increasingly expand in a direction toward the assembly opening of the caliper.

3. A brake pad for a sliding caliper disc brake, comprising:
    a pad backing plate having a friction material side surface and a back-side surface, said side surfaces being arranged parallel to one another;
    a friction pad material fastened to the friction material side surface of the pad backing plate; and
    at least one recess arranged in the back side surface of the pad backing plate, said recess extending in a longitudinal direction of the pad backing plate, being arranged spaced from edges of the pad backing plate delimiting the longitudinal sides, and having a cross-sectional profile configured to adapt to a contact angle of a rear-end wall of a caliper of the sliding caliper disc brake that changes via caliper deformation during brake application.

4. The brake pad according to claim 3, wherein the recess extends non-linearly.

5. The brake pad according to claim 3, wherein the recess has at least one bend in a longitudinal extent.

6. The brake pad according to claim 3, wherein the recess is arranged in an upper half of the pad backing plate.

7. The brake pad according to claim 3, wherein the recess is configured to have sharp-edges.

8. The brake pad according to claim 3, wherein the recess is configured to have flat transitions to adjoining regions of the back-side of the pad backing plate that are raised relative to the recess.

9. The brake pad according to claim 3, wherein the recess is arranged in an insert, said insert being inserted into the back-side of the pad backing plate.

10. A brake pad for a sliding caliper disc brake, comprising:
    a pad backing plate having a friction material side surface and a back-side surface, said side surfaces being arranged parallel to one another;
    a friction pad material fastened to the friction material side surface of the pad backing plate; and
    at least one recess arranged in the back side surface of the pad backing plate, said recess extending in a longitudinal direction of the pad backing plate and being arranged spaced from edges of the pad backing plate delimiting the longitudinal sides,
    wherein a plurality of recesses are arranged in the back-side of the pad backing plate, and a cross-sectional profile of the recess is adapted to a contact angle of the rear-end wall that changes via deformation of the caliper during application of the disc brake.

11. The brake padding according to claim 10, wherein the plurality of recesses are arranged symmetrically relative to a radial axis of the brake pad.

12. The brake padding according to claim 10, wherein the plurality of recesses are arranged asymmetrically relative to a radial axis of the brake pad.

* * * * *